US 6,644,686 B2

(12) United States Patent
Saelzle

(10) Patent No.: US 6,644,686 B2
(45) Date of Patent: Nov. 11, 2003

(54) DEVICE FOR FIXING A GAS BAG AND A SIDE GAS BAG PROTECTIVE DEVICE

(75) Inventor: Günther Saelzle, Aspach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 103 days.

(21) Appl. No.: 09/974,965

(22) Filed: Oct. 11, 2001

(65) Prior Publication Data

US 2002/0043785 A1 Apr. 18, 2002

(30) Foreign Application Priority Data

Oct. 12, 2000 (DE) .................... 200 17 526 U

(51) Int. Cl.⁷ .............................. B60R 21/20
(52) U.S. Cl. ................... 280/728.3; 24/543; 24/662
(58) Field of Search .................. 280/728.3; 24/543, 24/542, 544, 662, 614; 292/209, 204, 102, 103, 107, DIG. 50

(56) References Cited

U.S. PATENT DOCUMENTS

| 4,646,399 A | * | 3/1987 | Clendinen ............... 24/624 |
| 5,060,972 A | * | 10/1991 | Satoh et al. ............ 280/732 |
| 5,109,576 A | * | 5/1992 | Teekell et al. ........ 24/30.5 R |
| 5,398,960 A | * | 3/1995 | Ravenberg et al. .... 280/728.3 |
| 5,520,410 A | * | 5/1996 | Sun ...................... 280/728.3 |
| 5,641,178 A | * | 6/1997 | Lee ...................... 280/728.3 |
| 5,647,608 A | * | 7/1997 | Damman et al. ...... 280/728.2 |
| 5,676,393 A | * | 10/1997 | Rose .................... 280/728.3 |
| 5,791,680 A | * | 8/1998 | Dyer .................... 280/728.3 |
| 5,799,971 A | * | 9/1998 | Asada .................. 280/730.2 |
| 5,833,263 A | * | 11/1998 | Wittmann et al. ..... 280/728.3 |
| 5,971,427 A | * | 10/1999 | Whited et al. ........ 280/730.2 |
| 6,106,006 A | * | 8/2000 | Bowers et al. ........ 280/730.2 |
| 6,209,906 B1 | * | 4/2001 | DeWitt ................. 280/728.3 |
| 6,209,907 B1 | | 4/2001 | Fischer |
| 6,446,638 B1 | * | 9/2002 | Horman ................ 132/275 |
| 6,447,005 B2 | * | 9/2002 | Alb et al. ............. 280/730.2 |
| 6,517,102 B2 | * | 2/2003 | Kolb .................... 280/728.3 |

FOREIGN PATENT DOCUMENTS

DE 29909326 U1 11/1999

* cited by examiner

Primary Examiner—Paul N. Dickson
Assistant Examiner—George D. Spisich
(74) Attorney, Agent, or Firm—Tarolli, Sundheim, Covell & Tummino L.L.P.

(57) ABSTRACT

The invention relates to a device for fixing a gas bag in its folded position, the device comprising a hollow receiving body having an outlet opening and provided for accommodating the gas bag. The receiving body has an opening flap connected with it, which in a closed state of the receiving body closes the outlet opening of the receiving body via a detent connection. The detent connection has a ring connected with and formed on one of the receiving body and the opening flap, and has at least one pair of projecting hooks connected with one of the opening flap and the receiving body. The hooks engage on opposite sections of the ring and are orientated facing away from each other. The invention further relates to a side gas bag protective means which is equipped with such a device.

14 Claims, 3 Drawing Sheets

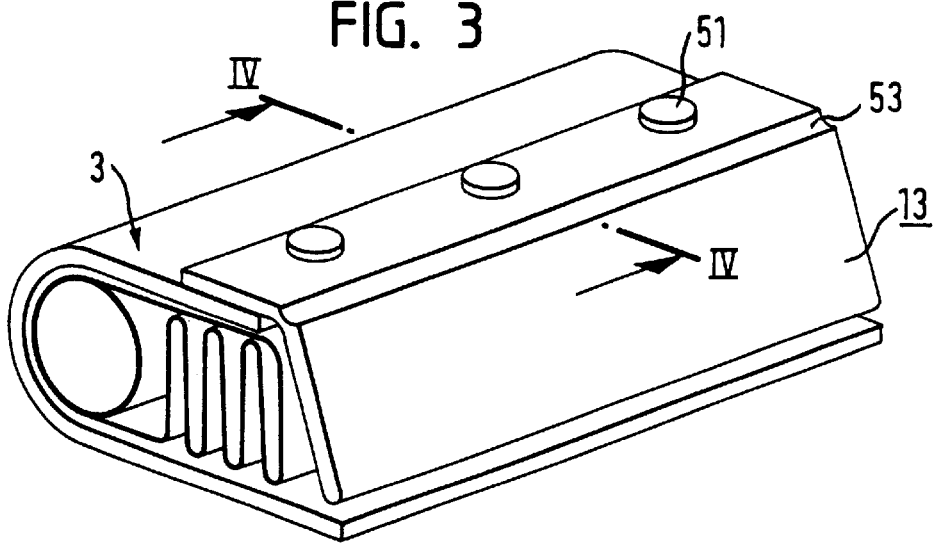
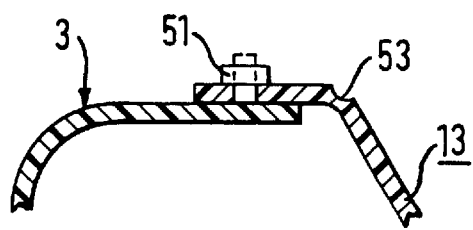
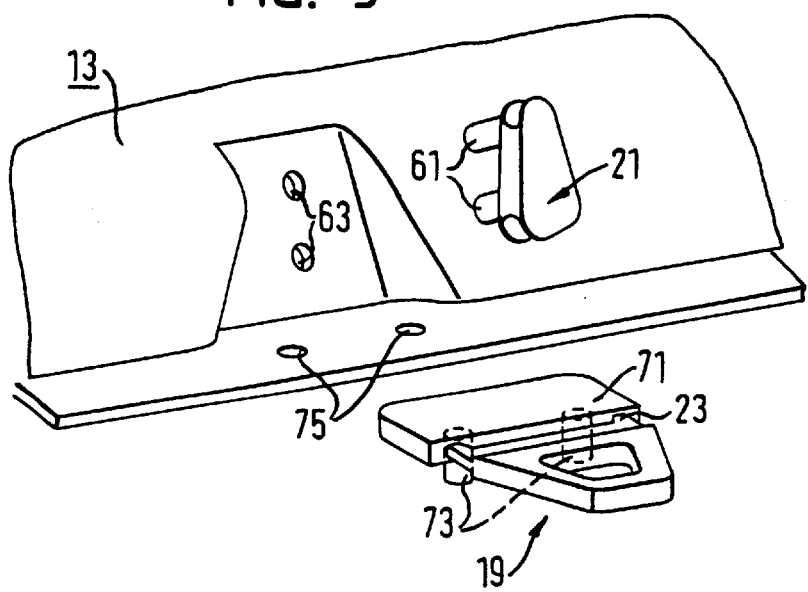

DEVICE FOR FIXING A GAS BAG AND A SIDE GAS BAG PROTECTIVE DEVICE

TECHNICAL FIELD

The invention relates to a device for fixing a gas bag in its folded position.

The invention further relates to a side gas bag protective means which is fastened along a roof frame of a vehicle and is equipped with such a device.

BACKGROUND OF THE INVENTION

Such a device is known for example from DE 299 09 326.3. In this document, there is described a receiving body for accommodating a gas bag, the receiving body having an opening flap and a detent connection for holding the flap in the closed state. In this device, the detent connection is associated to the opening flap and consists of a bracket into which a flexible closure hook engages.

BRIEF SUMMARY OF THE INVENTION

The invention provides a device which is distinguished by low forces for engaging and an increased reliability with regard to the interlocking of receiving body and opening flap. This is achieved in a device which comprises a hollow receiving body having an outlet opening and provided for accommodating the gas bag. The receiving body has an opening flap connected with it, which in a closed state of the receiving body closes the outlet opening of the receiving body via a detent connection. The detent connection has a ring connected with and formed on one of the receiving body and the opening flap, and has at least one pair of projecting hooks connected with one of the opening flap and the receiving body. The hooks engage on opposite sections of the ring and are orientated facing away from each other. In the device proposed, at least two hooks engage on one ring and hold the ring securely in the engaged position. Thereby, it can not occur that for example on installation, when the surroundings compress the receiving body, the ring is detached from a hook.

According to one embodiment, the hooks continue into each other and form sections of a nose.

At least one hook, preferably both hooks, have a receiving surface which is V- or U-shaped in side view, against which the ring lies. Opposite sections of the receiving surface can compress the ring in the closed state, i.e. they can squeeze it slightly such that it has a somewhat smaller thickness. During opening, when a tensile force is exerted onto the ring, the ring penetrates still deeper in the direction towards the base of the receiving surface, in order to be compressed still further, whereby in addition to the tensile force also a compressive force running perpendicularly hereto acts on the ring, so that the latter breaks intentionally and within predeterminable limits.

According to a preferred embodiment, the ring and/or the hooks are attached to the receiving body by welding, gluing, screwing or by rivets which are deformed in hot state.

According to another embodiment, the opening flap is formed integrally with the receiving body, so that it is possible to construct the entire receiving body in one piece. The ring and the hooks can then also be formed in one piece on this receiving body.

According to one embodiment, a film hinge is provided by means of which the ring is integrally connected with the opening flap or with an edge of the receiving body limiting the outlet opening, which facilitates the closing of the detent connection and allows the ring to adapt itself to the orientation of the hooks.

The hooks are preferably arranged on a straight line which lies substantially perpendicular to the swivel axis defined by the film hinge. Thereby, one hook is produced which is closer to the swivel axis and one which is further away from the swivel axis, the hook which is further away preferably having to receive the tensile forces during opening.

In addition, the receiving body preferably has an indentation around the hooks, which receives the ring in the closed state of the receiving body. Thereby, neither the hook nor the ring projects outwards in the closed state of the receiving body, so that also the danger does not exist that, on opening, the receiving body gets caught on a piece of lining surrounding the receiving body and has a disadvantageous influence on the opening process.

The side gas bag protective means according to the invention is distinguished by the gas bag and the receiving body being coordinated with each other such that during unfolding of the gas bag a force is exerted onto a hook which is greater than the holding force of the detent connection. The holding force is the force with which the detent connection can oppose, to a maximum extent, a forceful opening. In the protective means according to the invention, the detent connection is opened by the unfolding gas bag.

Here, preferably, only one hook is stressed, which is bent or destroyed during opening. Another embodiment makes provision that the ring is destroyed during opening in the region of a section associated to one of the hooks.

BRIEF DESCRIPTION OF THE DRAWINGS

FIG. 3 shows a perspective view of a second embodiment of the side gas bag protective means with the receiving body closed, FIG. 4 shows a section along the line IV—IV in FIG. 3 in the region of the connection of opening flap and receiving body, FIG. 5 shows a perspective view of another embodiment of the detent connection.

DETAILED DESCRIPTION OF THE PREFERRED EMBODIMENTS

Figure 1:
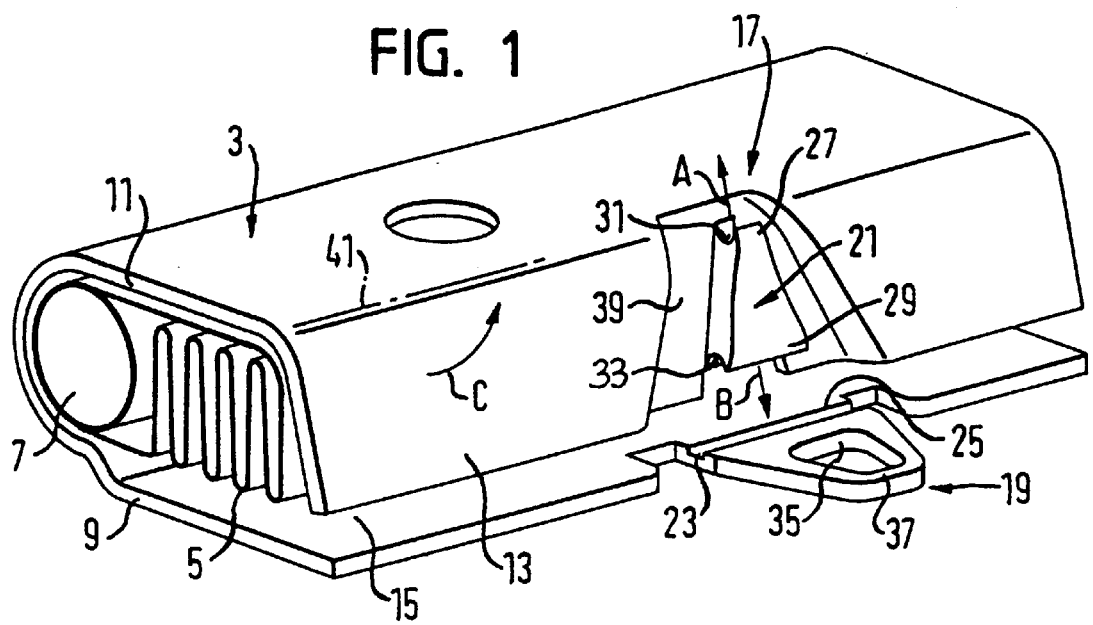
FIG. 1 shows a perspective view of a side gas bag protective means according to the invention, with a receiving body which is not yet closed.

In FIG. 1 a side gas bag protective means is illustrated, which is to be installed along a roof frame of a vehicle. The protective means has an elongated receiving body 3 of injection-molding material, only a section of which is illustrated, and which consists of numerous identical sections adjoining each other and connected with each other in one piece. In the receiving body 3 a folded gas bag 5 is housed, which in the inflated state can cover one or more side windows of a vehicle. In the receiving body 3 a gas-conducting pipe 7 is also housed, which is intended to permit a uniform filling of the gas bag along its entire length.

The receiving body 3 has a U-shaped profile in cross-section, with two opposing side walls 9, 11. A bent opening flap 13, projecting towards the side wall 9, is formed in one piece on the side wall 11. This opening flap closes an outlet opening 15 for the emerging gas bag 5 when unfolding. The hollow, one-piece receiving body 3 forms a device for fixing the gas bag 5 in its folded position, in which it is housed together with the receiving body 3 in the vehicle.

In the position shown in FIG. 1, the receiving body 3 has just been equipped with the gas bag 5 and it still has to be closed. For this, several detent connections 17 are provided along the entire longitudinal extent of the outlet opening 15, only one of which is illustrated by way of example in FIG. 1. The detent connection 17 comprises a triangular ring 19, formed in one piece on the receiving body 3, and also a nose 21 associated therewith.

The ring 19 is fastened via a film hinge 23 in one piece on the edge of the wall 9, which co-defines the outlet opening 15, and thus can be swiveled upwards about the swivel axis 25 defined by the film hinge, in order to engage on the nose 21. The nose 21 consists of two sections in the form of hooks 27, 29 continuing into each other, which define the upper or lower half of the nose 21. The hooks are orientated facing away from each other by having receiving surfaces 31, 33 pointing in opposite directions A, B, and having a V- or U-shape in side view. These receiving surfaces 31, 33 form saddle surfaces.

On closing the detent connection 17, opposing sections 35, 37 of the ring lie against the receiving surfaces 31 and 33, respectively.

The hooks 27, 29 lie on an imaginary straight line on which the arrows A and B lie. The straight line runs in a plane which lies perpendicular to the swivel axis 25. The hook 29 is therefore the one closer to the swivel axis and the hook 27 is the one further away.

Around the nose 21, which is formed in one piece on the receiving body 3, the receiving body 3 has an indentation 39 adapted to the shape of the ring 19.

Figure 2:
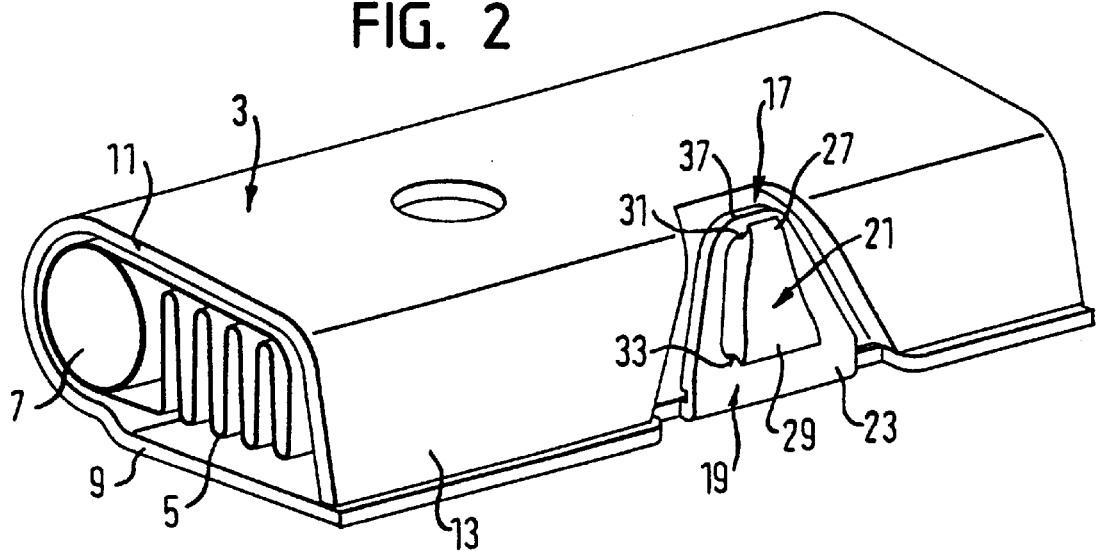
FIG. 2 shows the side gas bag protective means according to FIG. 1 with the receiving body closed.

In the closed state, which is shown in FIG. 2, the indentation 39 receives the ring 19 completely, so that the ring does not project laterally with respect to the outer surface of the receiving body outside the indentation 19.

For closure, the ring 19 is swiveled upwards about the swivel axis 25 and is then engaged with the section 35 in the hook 29, so that the section 35 lies against the receiving surface 33. The section 37 is then pressed over the hook 27, so that it engages in it and lies against the abutment surface 31. The detent connection which is thus formed closes the receiving body securely in both directions A and B, because the hooks 27, 29 endeavor to expand the ring in opposite directions A (opening) and B (closing).

During unfolding of the gas bag 5, the latter presses the walls 9, 11 in opposite directions, whereby a high force is introduced via the hook 27 into the ring 19 and hence the film hinge 23. As the receiving surface 31 narrows in the direction of the arrow B, the section 37 is pressed deeper and deeper into the narrowed portion defined by the receiving surface 31. The section 37 thereby undergoes a compressive force, so that compressive stress and tensile stress overlie each other in the section 37. On exceeding a defined maximum stress, the ring 19 breaks in the region of the section 37, so that the detent connection is destroyed and the receiving body can be opened.

Alternatively, the nose 27 can also shear off or be bent off elastically or plastically, in order to permit the swiveling up of the opening flap 13 about an imaginary axis 41. The connection between the hook 29 and the section 35 does not offer any appreciable resistance to the opening of the receiving body 3, because the orientation of the hook 29 is open to the swiveling direction C of the opening flap 13.

In the embodiment according to FIGS. 3 and 4, the receiving body 3 is constructed so as to be separate from the opening flap 13. The opening flap 13 is fastened to the receiving body 3 by means of rivets 51 which can be constructed as separate pieces or as extensions on the receiving body 3. As can be seen in FIG. 4, the rivets 51 are deformed in hot state on the free end or on both free ends, in order to achieve the fastening. The opening flap which is thus constructed has a film hinge 53, in order to facilitate the swiveling up and closing. Alternatively, the opening flap 13 can also be fastened to the receiving body 3 by welding, gluing or screwing. Also, a combination of such fastening possibilities is conceivable.

FIG. 5 shows that the detent connection 17 can be formed by fastening individual parts to the receiving body and/or to the opening flap. The nose 21 is constructed as a separate part which has on the inner face two projecting, formed-on pegs 61 which are inserted through openings 63 in the opening flap 13, to be deformed in hot state on the rear face. In this embodiment, the ring 19 is also constructed as a separate part and has a base section 71 which is connected with the ring itself via the film hinge 23. The base section 71 likewise has peg-like extensions 73, which are inserted in openings 75 in the receiving body 3 and are deformed in hot state on the rear face. Also any desired combinations of the embodiments according to FIGS. 1 to 5 are possible, with individual parts, formed on in one piece and constructed to be separate, and fastened to other parts.

Figure 6:
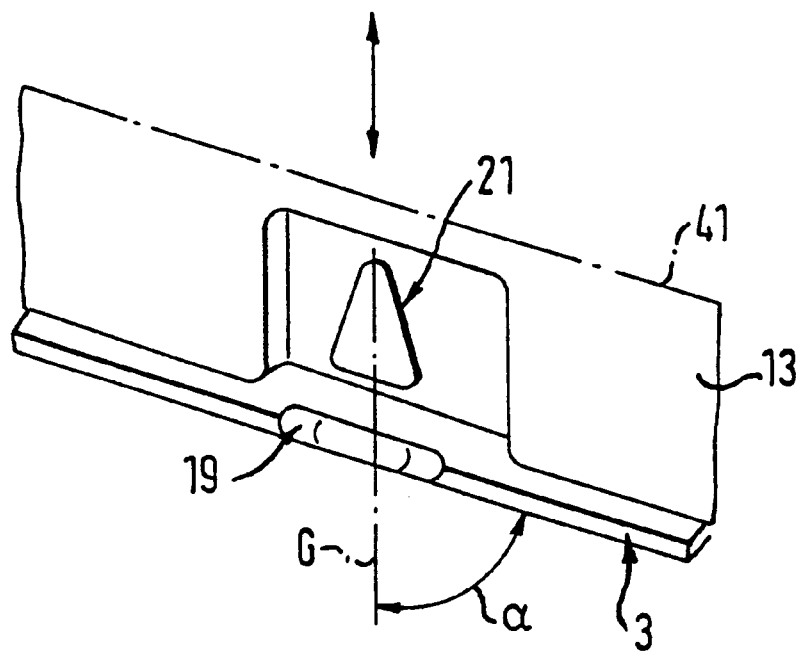
FIG. 6 shows a perspective view of a third embodiment of the receiving body in the region of a detent connection, with the detent connection not yet closed.
Figure 7:
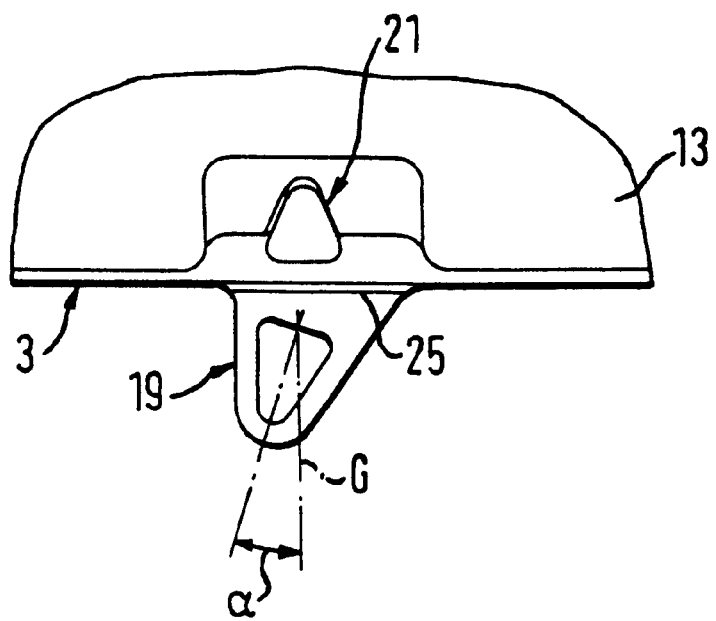
FIG. 7 shows the detent connection with the ring swiveled downwards.

The embodiments according to FIGS. 6 and 7 are intended to show that the straight line G passing through the hooks 27, 29 can also lie at an angle of other than 90° to the swivel axis 25 or to the axis 41. The ring and these axes must be orientated such that after the ring 19 is swiveled up, the ring comes to lie over the hook 27, 29. It is especially important in this connection that the hooks are not orientated transversely to the swiveling direction, because then they would not have a sufficient closing effect.

What is claimed is:

1. A device for fixing a gas bag in its folded position, said device comprising
    a hollow receiving body having an outlet opening and provided for accommodating said gas bag,
    said receiving body having an opening flap connected with it, which in a closed state of said receiving body closes said outlet opening of said receiving body via a detent connection,
    said detent connection having a ring connected with and formed on one of said receiving body and said opening flap, and having at least one pair of projecting hooks connected with one of said opening flap and said receiving body,
    said hooks engaging on opposite sections of said ring and being orientated facing away from each other.

2. The device according to claim 1, wherein said hooks are sections of a single nose.

3. The device according to claim 1, wherein at least one hook has a receiving surface which is V- or U-shaped in a side view, said ring lying against said receiving surface with said receiving body closed.

4. The device according to claim 3, wherein said receiving surface compresses said ring in said closed state and when said gas bag is unfolding, respectively.

5. The device according to claim 1, wherein at least one of said ring and said hooks is attached to said receiving body by at least one projection which is deformed in hot state.

6. The device according to claim 1, wherein a film hinge is provided by means of which said ring is integrally connected with one of said opening flap and an edge of said receiving body limiting said outlet opening.

7. The device according to claim 6, wherein said hooks lie on a straight line which lies in a plane extending substantially perpendicular to a swivel axis defined by said film hinge, so as to have one of said hooks closer to said swivel axis and the other hook further away from said swivel axis.

8. The device according to claim 1, wherein said receiving body has an indentation around said hooks, which receives said ring in said closed state of said receiving body.

9. The device according to claim 1, wherein said opening flap is formed integrally with said receiving body.

10. The device according to claim 1, wherein said receiving body is constructed in one piece.

11. A side gas bag protective means which is to be fastened along a roof frame of a vehicle, said means comprising a device for fixing a gas bag in its folded position including a hollow receiving body having an outlet opening and provided for accommodating said gas bag, said receiving body having an opening flap connected with it, which in a closed state of said receiving body closes said outlet opening of said receiving body via a detent connection, said detent connection having a ring connected with and formed on one of said receiving body and said opening flap, and having at least one pair of projecting hooks connected with one of said opening flap and said receiving body, said hooks engaging on opposite sections of said ring and being orientated facing away from each other, and comprising a gas bag which is surrounded by said device in said folded state of said gas bag, said gas bag, said receiving body and said opening flap being adapted to each other such that during unfolding of said gas bag a force is exerted onto said hooks which is greater than a holding force of said detent connection.

12. The side gas bag protective means according to claim 11, wherein only one of said hooks is exposed to stresses during opening by said gas bag, said hook being bent by said force exerted on it during opening.

13. The side gas bag protective means according to claim 11, wherein only one of said hooks is exposed to stresses during opening by said gas bag, said hook being destroyed by said force exerted on it during opening.

14. The side gas bag protective means according to claim 11, wherein, to open said receiving body by said unfolding gas bag, said ring is destroyed in a region of a section associated with one of said hooks.

\* \* \* \* \*